(12) United States Patent
Fukano (10) Patent No.: US 7,143,956 B2
(45) Date of Patent: Dec. 5, 2006

(54) SUCK BACK VALVE (75) Inventor: Yoshihiro Fukano, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 27 days.

(21) Appl. No.: 10/882,228

(22) Filed: Jul. 2, 2004

(65) Prior Publication Data

US 2005/0006609 A1   Jan. 13, 2005

(30) Foreign Application Priority Data

Jul. 7, 2003   (JP) .............................. 2003-271323

(51) Int. Cl.
*B05B 15/02* (2006.01)
*B05B 1/30* (2006.01)
*F23D 11/38* (2006.01)
*F23D 14/50* (2006.01)
*F16K 31/143* (2006.01)

(52) U.S. Cl. ...................... 239/119; 239/106; 239/586; 222/571; 251/63.5

(58) Field of Classification Search ................ 239/119, 239/106, 586, 583; 222/571; 251/63.5, 251/331
See application file for complete search history.

(56) References Cited

U.S. PATENT DOCUMENTS

| 4,597,719 | A | * | 7/1986 | Tano ........................... 417/317 |
| 5,918,810 | A | | 7/1999 | Fukano et al. |
| 5,927,605 | A | | 7/1999 | Odajima et al. |
| 5,931,384 | A | | 8/1999 | Fukano et al. |
| 5,938,119 | A | | 8/1999 | Yamada et al. |
| 5,950,923 | A | | 9/1999 | Fukano et al. |
| 5,950,924 | A | | 9/1999 | Hatakeyama et al. |
| 5,967,414 | A | | 10/1999 | Fukano et al. |
| 5,971,296 | A | | 10/1999 | Fukano et al. |
| 5,979,792 | A | | 11/1999 | Fukano et al. |
| 5,988,524 | A | | 11/1999 | Odajima et al. |
| 6,000,629 | A | | 12/1999 | Tamura et al. |
| 6,029,903 | A | | 2/2000 | Fukano et al. |
| 6,092,782 | A | * | 7/2000 | Yamada et al. ........ 251/129.05 |
| 6,176,438 | B1 | | 1/2001 | Sato et al. |
| 6,585,226 | B1 | * | 7/2003 | Fukano et al. ................. 251/28 |
| 6,612,538 | B1 | * | 9/2003 | Fukano et al. ............. 251/63.5 |
| 6,755,354 | B1 | | 6/2004 | Fukano et al. |

FOREIGN PATENT DOCUMENTS

| JP | 6-47092 B2 | 6/1994 |
| JP | 8-166075 | 6/1996 |

* cited by examiner

*Primary Examiner*—David A. Scherbel
*Assistant Examiner*—Darren Gorman
(74) *Attorney, Agent, or Firm*—Paul A. Guss (57) ABSTRACT

A suck back valve includes an ON/OFF valve mechanism which opens/closes a fluid passage by displacing a valve member together with a first piston under an action of a pressure fluid supplied into a first cylinder chamber, and a suck back mechanism which has a suction member formed deformably in a flow chamber to suck a pressure fluid contained in the fluid passage by displacing the suction member together with a second piston under an action of the pressure fluid supplied to a second cylinder chamber. The ON/OFF valve mechanism and the suck back mechanism are assembled coaxially and integrally.

12 Claims, 5 Drawing Sheets

SUCK BACK VALVE

BACKGROUND OF THE INVENTION

1. Field of the Invention

The present invention relates to a suck back valve capable of avoiding any liquid drip, for example, from a supply port for a pressure fluid by sucking a predetermined amount of the pressure fluid flowing through a fluid passage.

2. Description of the Related Art

A suck back valve has been hitherto used, for example, in steps for producing semiconductor wafers or the like. The suck back valve has a function to avoid the so-called liquid drip in which a minute amount of coating liquid is dripped from a supply port to the semiconductor wafer when the supply of the coating liquid to the semiconductor wafer is stopped.

Figure 5:
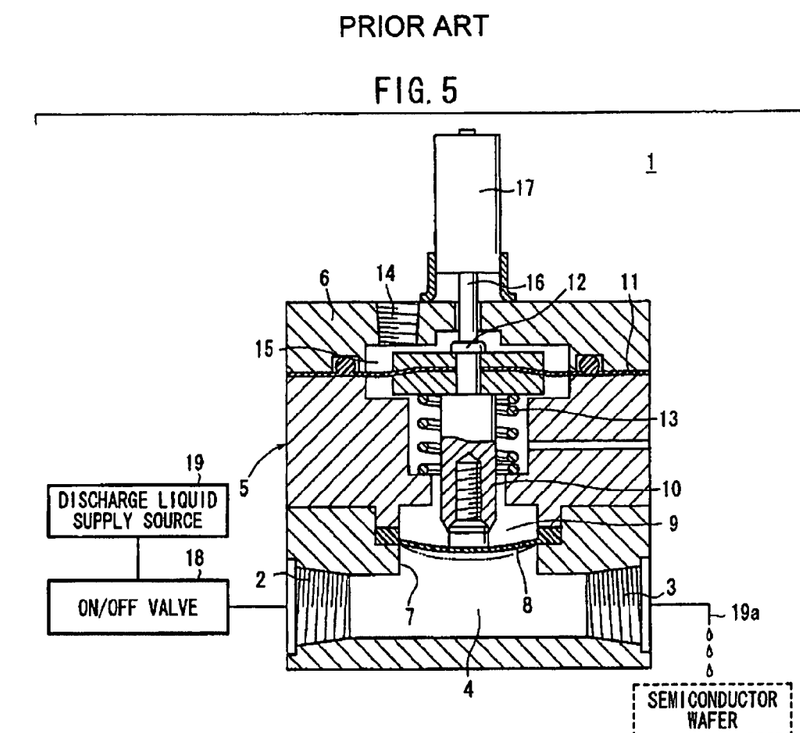
FIG. 5 shows a longitudinal sectional view illustrating a conventional suck back valve.

Such a conventional suck back valve is now shown in FIG. 5 (see, for example, Japanese Patent Publication No. 6-47092).

The suck back valve 1 includes a main body 5 which is formed with a flow chamber 4 for making communication between an inflow port 2 and an outflow port 3, and a cover 6 which is connected to an upper portion of the main body 5. The inflow port 2 is connected to a discharge liquid supply source 19 via an ON/OFF valve 18 which is constructed separately from the suck back valve 1. On the other hand, the outflow port 3 is connected to a nozzle 19a which drips the coating liquid toward the semiconductor wafer.

An opening 7, which extends upwardly, is formed at a substantially central portion of the flow chamber 4. A first diaphragm 8, which closes the upper surface of the flow chamber 4 in an air-tight manner, is stretched over the opening 7. A vertically movable member 10, which abuts against the first diaphragm 8 at the lower end, is arranged in an accommodation chamber 9 which is formed over the first diaphragm 8.

A second diaphragm 11, which is interposed between the main body 5 and the cover 6, is arranged at an upper portion of the vertically movable member 10. The second diaphragm 11 moves together with the vertically movable member 10 by the aid of a projection 12 which is caulked to the end of the vertically movable member 10 and which is secured to the second diaphragm 11.

A coil spring 13, which urges the second diaphragm 11 upwardly, is installed between the first diaphragm 8 and the second diaphragm 11. A pressure chamber 15, to which the pilot air is supplied via a pilot air port 14, is formed between the second diaphragm 11 and the cover 6. A detecting unit 17, which is provided with a detecting pin 16 to make abutment against the projection 12 of the vertically movable member 10, is provided on the cover 6.

The operation of the conventional suck back valve 1 will be briefly explained. When the ON/OFF valve 18, which is constructed separately, is in the ON state, and the liquid is supplied from the discharge liquid supply source 19, then the pressure chamber 15, to which the supply is effected from an unillustrated electropneumatic proportional valve to the pilot air port 14, has a high pressure. The second diaphragm 11 is located at the lower position indicated by the two-dot chain line shown in FIG. 5 while elastically compressing the coil spring 13. The first diaphragm 8, which is operated integrally with the vertically movable member 10, is also located at the lower position, and the volume of the flow chamber 4 is small.

Starting from the state as described above, when the ON/OFF valve 18 is switched to the OFF state to stop the supply of the liquid, then the pilot pressure, which is supplied from the pilot air port 14, is reduced, and the pressure in the pressure chamber 15 is lowered. Therefore, the first diaphragm 8 is moved upwardly together with the second diaphragm 11 and the vertically movable member 10 to give a state indicated by the solid line in FIG. 5. As a result, the first diaphragm 8 is deformed, and the volume of the flow chamber 4 is increased. Accordingly, the liquid remaining in the nozzle 19a is sucked.

However, in the case of the conventional suck back valve 1 as described above, the ON/OFF valve 18, which is constructed separately from the suck back valve 1, is used to allow the liquid to flow along the flow chamber 4 and/or stop the flow of the liquid. For this reason, the installation space is increased, and it is required to perform the piping operation for connecting the ON/OFF valve 18 and the suck back valve 1, which is complicated.

SUMMARY OF THE INVENTION

A general object of the present invention is to provide a suck back valve which reduces the installation space by realizing a small size and a light weight and which eliminates any piping operation with respect to an ON/OFF valve.

According to the present invention, a first piston and a valve member, which constitute an ON/OFF valve mechanism, are displaced together under an action of the pressure fluid supplied to a first cylinder chamber to close a fluid passage. Further, a second piston and a suction member, which constitute a suck back mechanism assembled integrally and coaxially with the ON/OFF valve mechanism, are displaced together under an action of the pressure fluid supplied to a second cylinder chamber. The suction member, which is displaceable together with the second piston, is deformed to increase the volume of a flow chamber. Accordingly, the sucking action is generated, and any liquid drip is avoided.

Therefore, the ON/OFF valve mechanism and the suck back mechanism are assembled coaxially and integrally by using the first piston and the second piston which are arranged coaxially. Accordingly, a small size and a light weight are realized, and it is possible to reduce the installation space.

Further, it is unnecessary to perform any piping operation with respect to the ON/OFF valve unlike the conventional technique. Therefore, the installation operation is convenient.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
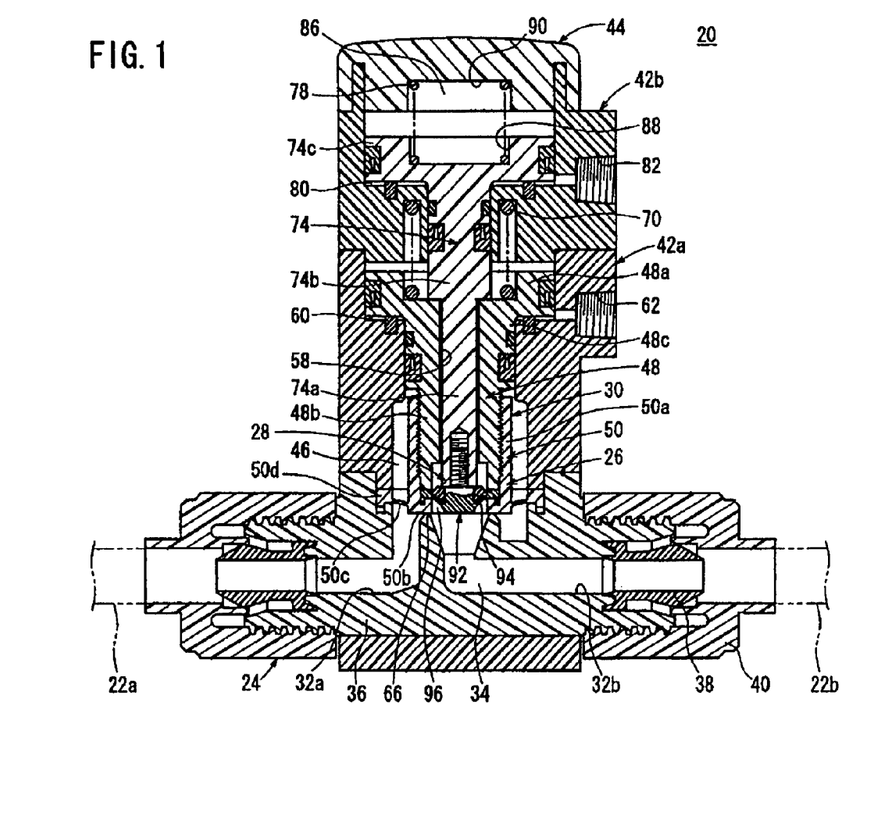
FIG. 1 shows a longitudinal sectional view illustrating a suck back valve according to an embodiment of the present invention.

With reference to FIG. 1, reference numeral 20 indicates a suck back valve according to an embodiment of the present invention. The suck back valve 20 comprises a joint section 24 to which a pair of tubes 22a, 22b are detachably connected while being separated from each other by a predetermined spacing distance, and a valve-driving section 30 which is formed on the joint section 24 and which is constructed by integrally assembling an ON/OFF valve mechanism 26 and a suck back mechanism 28 arranged therein.

The joint section 24 includes a joint body 36 which has a first port 32a formed at one end and a second port 32b formed at the other end and which is provided with a fluid passage 34 for making communication between the first port 32a and the second port 32b, inner members 38 which are engaged with the first port 32a and the second port 32b respectively and which are inserted into openings of the tubes 22a, 22b, and lock nuts 40 which retain the liquid tightness or air tightness for the connecting portions of the tubes 22a, 22b by being screw-engaged into screw grooves engraved at the ends of the joint body 36.

The valve-driving section 30 includes a cover member 44 and a first body 42a and a second body 42b each of which is composed of a block member made of resin. The first body 42a, the second body 42b, and the cover member 44 are integrally connected to the joint body 36 by the aid of an unillustrated shaft. A first chamber 46 is formed in the first body 42a. A valve member 50 and a first piston 48 for constructing the ON/OFF valve mechanism 26 are provided in the first chamber 46 so that they are displaceable together.

The first body 42a, the second body 42b, the cover member 44, and the joint body 36, which are integrally assembled, function as a main body section.

Figure 2:
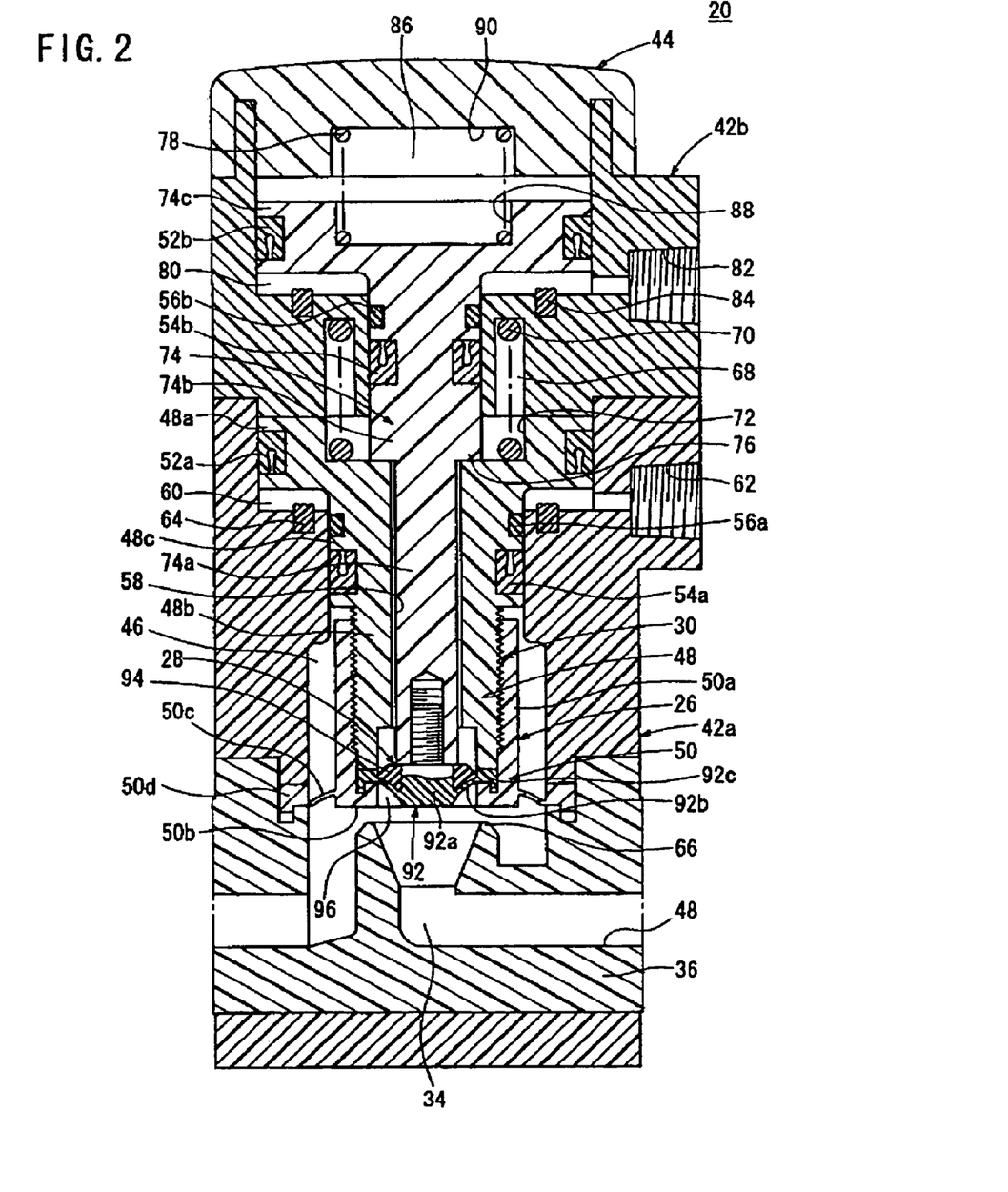
FIG. 2 shows, with partial omission, a magnified longitudinal sectional view illustrating the ON state of an ON/OFF valve mechanism in which a first piston and a second piston are moved together upwardly.

As shown in FIG. 2, the first piston 48 includes a diametrally expanded section 48a which is disposed on the upper side, a cylindrical section 48b which is disposed on the lower side, and an annular step section 48c which is disposed between the diametrally expanded section 48a and the cylindrical section 48b. A first piston packing 52a, which has a U-shaped cross section, is installed to an annular groove on the outer circumferential surface of the diametrally expanded section 48a. A wear ring 56a and a packing 54a having a U-shaped cross section are installed to annular grooves on the outer circumferential surface of the annular step section 48c respectively.

A through-hole 58, which extends in the axial direction, is formed for the first piston 48. Further, a valve member 50, which opens/closes the fluid passage 34, is screw-fastened to one end (on the lower side) in the axial direction of the first piston 48.

A first cylinder chamber 60 is formed on the lower side of the diametrally expanded section 48a of the first piston 48. The first cylinder chamber 60 is provided to make communication with a first pilot port 62 via a passage.

An annular first damper member 64, which prevents the diametrally expanded section 48a of the first piston 48 from making abutment against the first body 42a and which absorbs any shock upon the downward movement, is arranged on the inner wall surface of the first body 42a facing the first cylinder chamber 60.

The valve member 50 comprises a cylindrical member 50a which has a female thread formed on the inner wall surface to be fitted to a male thread formed on the outer circumferential portion of the first piston 48, an abutment section 50b which is provided at the bottom surface portion of the cylindrical member 50a to block the communication between the first port 32a and the second port 32b by being seated on a seat section 66 formed on the joint body 36, a thin-walled section 50c which protrudes radially outwardly from the bottom surface portion of the cylindrical member 50a and which is formed bendably, and a thick-walled interposing section 50d which is formed at the circumferential edge portion of the thin-walled section 50c and which is interposed between the joint body 36 and the first body 42a.

In this arrangement, it is preferable that each of the cylindrical member 50a, the abutment section 50b, the thin-walled section 50c, and the interposing section 50d for constructing the valve member 50 is integrally formed of, for example, a resin material such as polytetrafluoroethylene (PTFE).

A second chamber 68 is provided over the first piston 48. A first coil spring 70 is arranged in the second chamber 68. One end of the first coil spring 70 is fastened to a recess 72 of the first piston 48, and the other end is fastened to an annular groove of the second body 42b. The first piston 48 is always pressed downwardly by the action of the spring force of the first coil spring 70. The first piston 48 is urged so that the abutment section 50b of the valve member 50 is seated on the seat section 66.

A second piston 74, which constitutes the suck back mechanism 28, is arranged in the second chamber 68. The second piston 74 comprises a first rod section 74a having a small diameter which extends along the through-hole 58 of the first piston 48, a second rod section 74b having a middle diameter which is formed continuously to the first rod section 74a and which has an annular step 76 to make engagement with the recess 72 of the first piston 48, and a large diameter section 74c which is formed continuously to the second rod section 74b.

In this arrangement, the diametrally expanded section 48a of the first piston 48 is pressed upwardly under the action of the pilot pressure supplied into the first cylinder chamber 60 via the first pilot port 62 to overcome the summed spring force of those of the first coil spring 70 and a second coil spring 78 (as described later on). Accordingly, the first piston 48 and the second piston 74 are provided displaceably together in the upward direction.

In other words, the diametrally expanded section 48a of the first piston 48 is pressed upwardly under the action of the pilot pressure introduced into the first cylinder chamber 60, and the second piston 74 is also pressed upwardly by the aid of the annular step section 76 of the second piston 74 engaged with the recess 72 of the first piston 48 to overcome the summed spring force of those of the first and second coil springs 70, 78 fastened to the first piston 48 and the second piston 74 respectively. Accordingly, the first piston 48 and the second piston 74 are moved upwardly respectively.

A second piston packing 52b having a U-shaped cross section is installed to an annular groove on the outer circumferential surface of the large diameter section 74c. A wear ring 56b and a packing 54b having a U-shaped cross section are installed to annular grooves on the outer circumferential surface of the second rod section 74b respectively.

A second cylinder chamber 80 is formed under the large diameter section 74c. The second cylinder chamber 80 is provided to make communication with a second pilot port 82 via a passage. In this arrangement, the large diameter section 74c is pressed upwardly under the action of the pilot pressure supplied from the second pilot port 82. The second piston 74 including the large diameter section 74c is provided displaceably together in the vertical direction.

An annular second damper member 84, which prevents the large diameter section 74c of the second piston 74 from making abutment against the inner wall surface of the second body 42b and which absorbs any shock upon the downward movement, is arranged on the inner wall surface of the second body 42b facing the second cylinder chamber 80.

A third chamber 86 is provided between the second piston 74 and the cover member 44. The second coil spring 78 is arranged in the third chamber 86. One end of the second coil spring 78 is fastened to a recess 88 of the second piston 74, and the other end is fastened to a recess 90 of the cover member 44. In this arrangement, the second piston 74 is always pressed downwardly under the action of the spring force of the second coil spring 78. The second piston 74 is urged so that the second rod section 74b makes abutment against the recess 72 of the first piston 48.

In this arrangement, the large diameter section 74c is pressed upwardly under the action of the pilot pressure supplied from the second pilot port 82 to overcome the spring force of the second coil spring 78. Accordingly, only the second piston 74 including the large diameter section 74c is provided displaceably in the upward direction.

A suction member 92, which is formed of, for example, a flexible material, is screw-fastened to the lower end of the first rod section 74a. The suction member 92 comprises a thick-walled section 92a which is disposed centrally, a thin-walled section 92b which is disposed around the thick-walled section 92a, and an interposing section 92c which is interposed between the end surface of the first piston 48 and an annular flange of the valve member 50. A protective ring 94, which is composed of, for example, a rubber material and which protects the thin-walled section 92b, is provided on the upper surface of the thin-walled section 92b.

In this arrangement, the suction member 92 is provided displaceably in the vertical direction together with the second piston 74 by the aid of the first rod section 74a. The suction member 92 is movable upwardly to make deformation, and thus a flow chamber 96 is formed between the bottom surfaces of the thick-walled section 92a and the thin-walled section 92b and the inner wall surface of the cylindrical section 48b of the first piston 48.

The suck back valve 20 according to the embodiment of the present invention is basically constructed as described above. Next, its operation, function, and effect will be explained.

Figure 4:
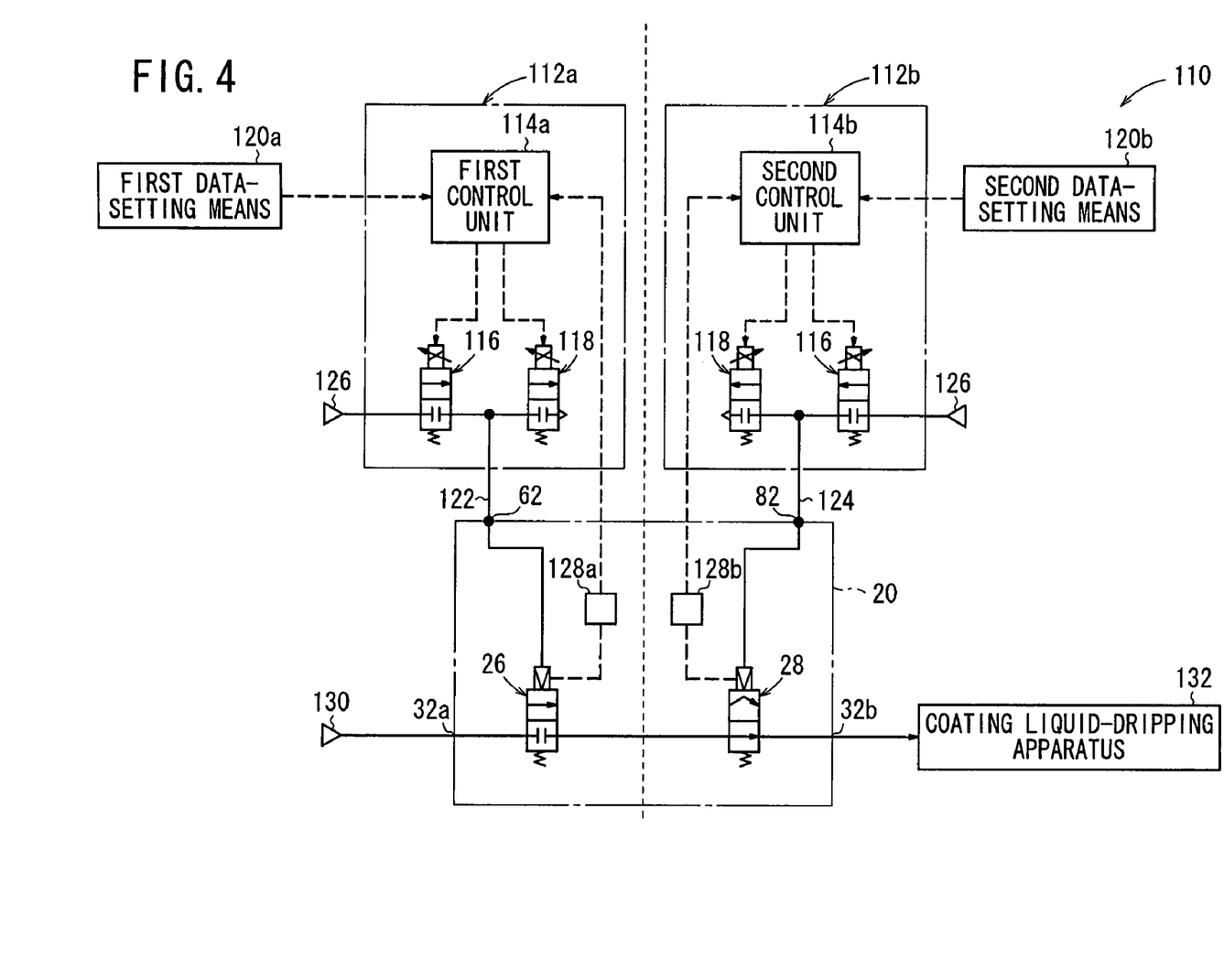
FIG. 4 shows a circuit diagram illustrating a suck back system into which the suck back valve shown in FIG. 1 is incorporated.

FIG. 4 shows a suck back system 110 including the suck back valve 20 according to the embodiment of the present invention.

The suck back system 110 comprises first and second electropneumatic proportional valves 112a, 112b which are constructed identically and which output pneumatic pressure signals corresponding to inputted electric signals.

The first and second electropneumatic proportional valves 112a, 112b comprise first and second control units (control means) 114a, 114b, and supply solenoid-operated valves 116 and discharge solenoid-operated valves 118 of the normally closed type which are energized/deenergized on the basis of command signals (ON signal/OFF signals) outputted from the first and second control units 114a, 114b respectively.

First and second data-setting means 120a, 120b, which introduce setting signals into the first and second control units 114a, 114b, are connected to the first and second electropneumatic proportional valves 112a, 112b respectively.

In this arrangement, a passage 122, which is branched from the communication passage between the supply solenoid-operated valve 116 and the discharge solenoid-operated valve 118 for constructing the first electropneumatic proportional valve 112a, is connected to the first pilot port 62 of the ON/OFF valve mechanism 26. On the other hand, a passage 124, which is branched from the communication passage between the supply solenoid-operated valve 116 and the discharge solenoid-operated valve 118 for constructing the second electropneumatic proportional valve 112b, is connected to the second pilot port 82 of the suck back mechanism 28.

An unillustrated MPU (microprocessor unit), which functions as respective means for control, judgment, processing, calculation, and storage, is provided for each of the first and second control units 114a, 114b. A control signal, which is derived from MPU, is used to energize/deenergize the supply solenoid-operated valve 116 and/or the discharge solenoid-operated valve 118. Accordingly, the pilot pressure, which is supplied to each of the first cylinder chamber 60 of the ON/OFF valve mechanism 26 and the second cylinder chamber 80 of the suck back mechanism 28, is controlled.

A first position-detecting sensor 128a, which is provided for the ON/OFF valve mechanism 26, is electrically connected to the first control unit 114a. A position detection signal, which is obtained by the first position-detecting sensor 128a, is introduced into the first control unit 114a. On the other hand, a second position-detecting sensor 128b, which is provided for the suck back mechanism 28, is electrically connected to the second control unit 114b. A position detection signal, which is obtained by the second position-detecting sensor 128b, is introduced into the second control unit 114b.

A coating liquid supply source 130, in which the coating liquid is stored, is connected to the tube 22 which is communicated with the first port 32a of the suck back valve 20. On the other hand, a coating liquid-dripping apparatus 132, which is provided with a nozzle for dripping the coating liquid toward an unillustrated semiconductor wafer, is previously connected to the tube 22b which is communicated with the second port 32b.

After performing the preparatory operation as described above, the pressure fluid supply sources 126 are energized to introduce the pressure fluid (for example, air) into the first and second electropneumatic proportional valves 112a, 112b. The pilot pressure, which is introduced into the ON/OFF valve mechanism 26 via the supply solenoid-operated valve 116, is supplied to the first cylinder chamber 60 via the first pilot port 62. The first piston 48, the valve member 50, and the second piston 74 overcome the summed spring force of those of the first and second coil springs 70, 78, and move together upwardly. Accordingly, the abutment section 50b of the valve member 50 is separated from the seat section 66 to give the ON state in which the first port 32a and the second port 32b are communicated with each other (see FIG. 2).

The coating liquid, which is supplied from the coating liquid supply source 130 in the ON state of the ON/OFF valve mechanism 26 as described above, flows along the fluid passage 34, and the coating liquid is dripped onto the semiconductor wafer by the aid of the coating liquid-dripping apparatus 132. As a result, a coating film (not shown) having a desired film thickness is formed on the semiconductor wafer.

A predetermined amount of the coating liquid is applied to the unillustrated semiconductor wafer by the aid of the coating liquid-dripping apparatus 132. After that, the supply solenoid-operated valve 116 and/or the discharge solenoid-operated valve 118 are appropriately energized/deenergized by the control signal derived from the unillustrated MPU of the first control unit 114a. Accordingly, the pilot pressure, which is supplied to the first cylinder chamber 60 of the ON/OFF valve mechanism 26, is decreased so that the ON/OFF valve mechanism 26 is in the OFF state.

That is, the pilot pressure, which is supplied to the first cylinder chamber 60 of the ON/OFF valve mechanism 26, is decreased to zero. Accordingly, the first piston 48 and the second piston 74 are displaced together in the downward direction under the action of the spring forces of the first coil spring 70 and the second coil spring 78. The abutment section 50b of the valve member 50 is seated on the seat section 66 (see FIG. 1). The displacement of the first piston 48 is detected by the first position-detecting sensor 128a, and the position detection signal is introduced into the first control unit 114a. Accordingly, the first control unit 114a confirms the fact that the ON/OFF valve mechanism 26 is in the OFF state.

Therefore, the ON/OFF valve mechanism 26 is in the OFF state, the fluid passage 34 is blocked, and thus the supply of the coating liquid to the semiconductor wafer is stopped to stop the dripping of the coating liquid to the semiconductor wafer from the nozzle of the coating liquid-dripping apparatus 132. In this situation, the coating liquid, which is just before being dripped onto the semiconductor wafer, remains in the nozzle of the coating liquid-dripping apparatus 132. Therefore, it is feared that any liquid drip may be caused.

Accordingly, the second control unit 114b derives the energizing signal to the supply solenoid-operated valve 116 of the second electropneumatic proportional valve 112b so that the supply solenoid-operated valve 116 is in the ON state. Simultaneously, the second control unit 114b derives the deenergizing signal to the discharge solenoid-operated valve 118 so that the discharge solenoid-operated valve 118 is in the OFF state.

Therefore, when the pilot pressure is supplied to the second cylinder chamber 80 of the suck back mechanism 28, the second piston 74 overcomes the spring force of the second coil spring 78 to make the upward movement. In this situation, the upper surface of the second piston 74 abuts against the inner wall surface of the cover member 44, and thus the upward displacement of the second piston 74 is regulated. The first piston 48 is in the state in which the first piston 48 is pressed downwardly by the spring force of the first coil spring 70. The first piston 48 is in the stationary state.

Figure 3:
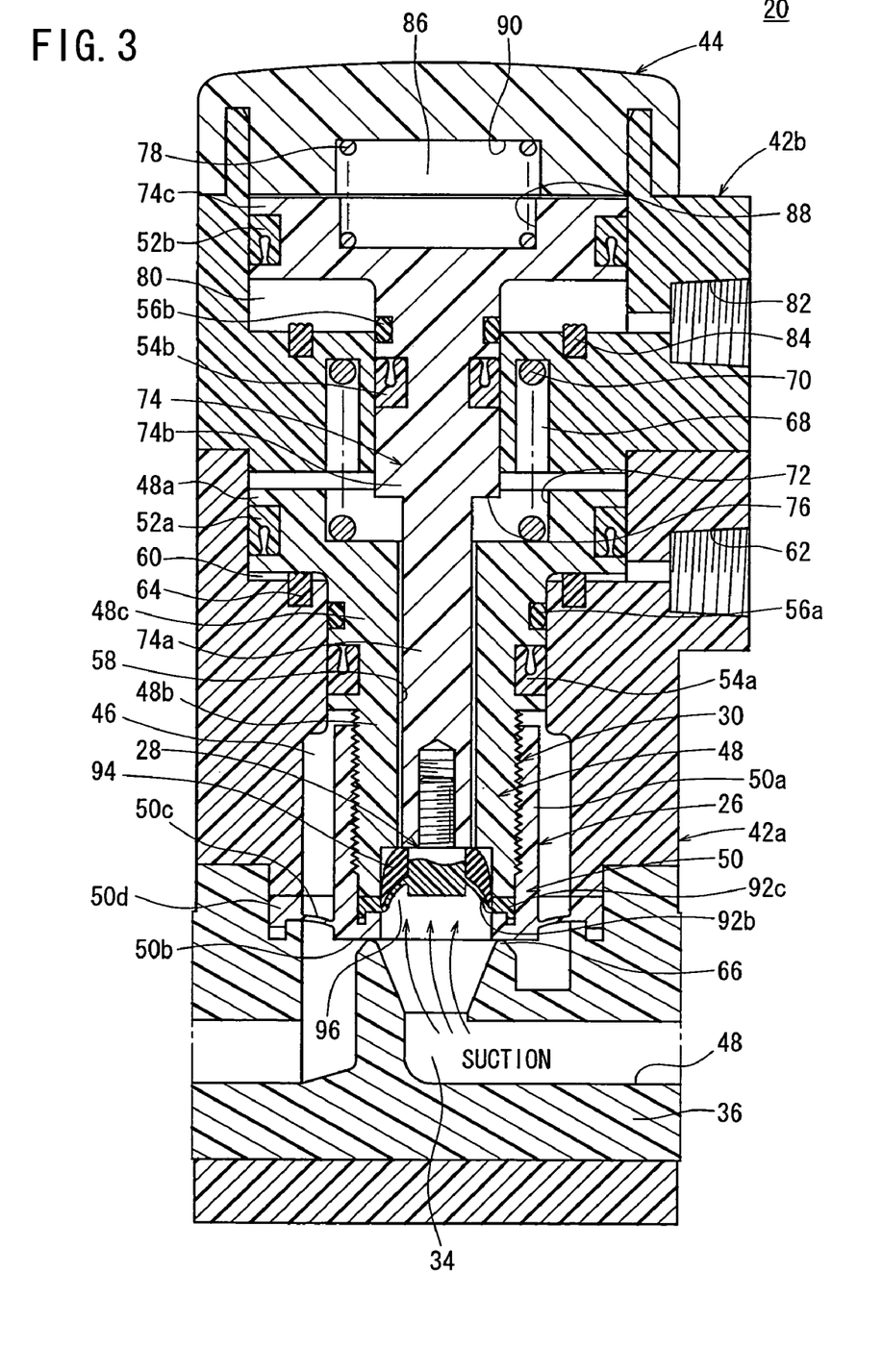
FIG. 3 shows, with partial omission, a magnified longitudinal sectional view illustrating a state in which a suck back mechanism is in the ON state and a suction member is moved upwardly when the ON/OFF valve mechanism is in the OFF state.

Therefore, as shown in FIG. 3, the suction member 92, which is connected to one end of the second piston 74, is moved upwardly together with the second piston 74 to make the deformation. Accordingly, the volume of the flow chamber 96 formed therein is increased to cause the negative pressure action. During this process, a predetermined amount of the coating liquid contained in the fluid passage 34 is sucked in accordance with the expansion of the flow chamber 96.

As a result, a predetermined amount of the coating liquid remaining in the nozzle of the coating liquid-dripping apparatus 132 is sucked toward the suck back valve 20. Thus, it is possible to avoid any liquid drip toward the semiconductor wafer.

When the pressure of the pilot pressure supplied to the second cylinder chamber 80 is increased to move the second piston 74 upwardly, then the second position-detecting sensor 128b detects the displacement of the second piston 74, and the position detection signal, which is derived from the second position-detecting sensor 128b, is introduced into the second control unit 114b.

The energizing signal is derived from the first control unit 114a so that the ON/OFF valve mechanism 26 is in the ON state, simultaneously with which the deenergizing signal is derived from the second control unit 114b to the supply solenoid-operated valve 116 to give the OFF state, while the energizing signal is derived to the discharge solenoid-operated valve 118 to give the ON state. Accordingly, the initial state is given, and the dripping of the coating liquid to the semiconductor wafer is started.

In the embodiment of the present invention, the first piston 48 and the valve member 50, which constitute the ON/OFF valve mechanism 26, are displaced together to open/close the fluid passage 34 under the action of the pilot pressure supplied to the first cylinder chamber 60. Further, a part of the second piston 74 (first rod section 74a), which constitutes the suck back mechanism 28, is internally installed with respect to the through-hole 58 formed in the first piston 48. The second piston 74 and the suction member 92 are displaced together under the action of the pilot pressure supplied to the second cylinder chamber 80.

In this situation, the first piston 48 and the second piston 74 are moved together upwardly under the action of the pilot pressure supplied to the first cylinder chamber 60 while overcoming the summed spring force of those of the first and second coil springs 70, 78. Further, only the second piston 74 is moved upwardly under the action of the pilot pressure supplied to the second cylinder chamber 80. The suction member 92, which is connected to the end of the second piston 74, is deformed to increase the volume of the flow chamber 96 so that the sucking action is exhibited.

Therefore, in the embodiment of the present invention, the first piston 48 and the second piston 74, which are arranged coaxially, are used to coaxially and integrally assemble the ON/OFF valve mechanism 26 and the suck back mechanism 28. Accordingly, the small size and the light weight are realized, and it is possible to reduce the installation space.

Further, in the embodiment of the present invention, the ON/OFF valve mechanism 26 and the suck back mechanism 28 are coaxially and integrally assembled and arranged in the space which is formed by the first body 42a, the second body 42b, and the cover member 44. Therefore, it is unnecessary to perform any piping operation with respect to the ON/OFF valve 18 unlike the conventional technique as shown in FIG. 5. The installation can be effected conveniently.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A suck back valve comprising:
    a main body section which is provided with a fluid passage for making communication between a first port and a second port;
    an ON/OFF valve mechanism which opens/closes said fluid passage by displacing a valve member together with a first piston under an action of a pressure fluid when said pressure fluid is supplied into a first cylinder chamber via a first pilot port; and
    a suck back mechanism which has a deformable suction member with a flow chamber formed therein so that fluid contained in said fluid passage is sucked by displacing said suction member together with a second piston under an action of said pressure fluid when said pressure fluid is supplied to a second cylinder chamber via a second pilot port,
    wherein said ON/OFF valve mechanism and said suck back mechanism are assembled coaxially and integrally, and
    wherein a through-hole, which extends in an axial direction, is formed in said first piston, and a part of said second piston is internally installed in said through-hole.

2. The suck back valve according to claim 1, wherein said first piston and said second piston are moved together upwardly under an action of said pressure fluid when said pressure fluid is supplied into said first cylinder chamber, while only said second piston is moved upwardly under an action of said pressure fluid when said pressure fluid is supplied into said second cylinder chamber.

3. The suck back valve according to claim 2, wherein said first piston includes a diametrally expanded section which is disposed on an upper side, a cylindrical section which is disposed on a lower side, and an annular step section which is formed between said diametrally expanded section and said cylindrical section.

4. The suck back valve according to claim 3, wherein said first cylinder chamber is formed between an inner wall of said main body section and said diametrally expanded section under said diametrally expanded section of said first piston.

5. The suck back valve according to claim 1, wherein said valve member includes a cylindrical member which is fitted to an outer circumference of said first piston, an abutment section which is provided at a bottom surface portion of said cylindrical member and which is to be seated on a seat section of said main body section, a thin-walled section which protrudes radially outwardly from said bottom surface portion of said cylindrical member and which is formed bendably, and an interposing section which is formed at a circumferential edge of said thin-walled section.

6. The suck back valve according to claim 5, wherein each of said cylindrical member, said abutment section, said thin-walled section, and said interposing section, which constitutes said valve member, is formed integrally with a resin material.

7. The suck back valve according to claim 1, further comprising a first spring member which presses said first piston and said valve member, wherein said valve member is urged to be seated on a seat section formed on said main body section by a spring force of said first spring member.

8. The suck back valve according to claim 2, wherein said second piston includes a first rod section which extends along said through-hole of said first piston, a second rod section which has an annular step section to make engagement with a recess of said first piston, and a large diameter section which is formed continuously to said second rod section.

9. The suck back valve according to claim 7, wherein a chamber is provided between said second piston and an inner wall of said main body section, and a second spring member is arranged in said chamber.

10. The suck back valve according to claim 8, wherein said suction member is connected to an end of said first rod section.

11. The suck back valve according to claim 1, wherein said suction member includes a thick-walled section which is disposed centrally, a thin-walled section which is formed around said thick-walled section, and an interposing section which is interposed between said first piston and said valve member.

12. The suck back valve according to claim 1, wherein a first damper member and a second damper member, which absorb shock when said first piston and said second piston are displaced, are provided in said first cylinder chamber and said second cylinder chamber respectively.

* * * * *